United States Patent [19]

Jensen

[11] Patent Number: 5,362,392

[45] Date of Patent: Nov. 8, 1994

[54] FILTER HEAD WITH INTEGRAL PRIMING PUMP

[75] Inventor: Russell D. Jensen, Modesto, Calif.

[73] Assignee: Parker Hannifin Corporation, Cleveland, Ohio

[21] Appl. No.: 28,101

[22] Filed: Mar. 8, 1993

[51] Int. Cl.$^5$ .................................. B01D 35/01
[52] U.S. Cl. ................... 210/249; 210/416.4
[58] Field of Search ............... 210/416.4, 249; 417/568; 248/94

[56] References Cited

U.S. PATENT DOCUMENTS

| | | | |
|---|---|---|---|
| 2,365,237 | 12/1944 | Allen, Jr. | 417/568 |
| 2,496,688 | 2/1950 | Armstrong | 417/568 |
| 3,220,351 | 11/1965 | Kling | 417/568 |
| 3,429,274 | 2/1969 | Nilsson | 417/568 |
| 3,565,555 | 2/1971 | Akashi et al. | 417/568 |
| 4,437,986 | 3/1984 | Hutchins et al. | 210/130 |
| 4,491,120 | 1/1985 | Hodgkins | 123/557 |
| 4,500,425 | 2/1985 | Thornton et al. | 210/136 |
| 4,860,713 | 8/1989 | Hodgkins | 123/510 |
| 4,935,127 | 6/1990 | Lowsky et al. | 210/130 |
| 4,956,081 | 9/1990 | Hodgkins et al. | 210/136 |
| 4,971,528 | 11/1990 | Hodgkins et al. | 417/310 |
| 5,207,898 | 5/1993 | Hodgkins | 210/416.4 |

*Primary Examiner*—Matthew O. Savage
*Attorney, Agent, or Firm*—Ralph E. Jocke

[57] ABSTRACT

A filter head with an integral priming pump (10) is adapted to engage a replaceable filter or separator element (20). The head has an axial stepped bore (46). The bore has a first area (52) in fluid connection with an inlet (14) which delivers fuel to the head. A second area (54) of the bore of larger diameter is in fluid connection with a pumping chamber (77) of a pump portion (18) of the head. A third area (60) of the bore is in fluid communication with a fluid in-flow area of the element through a spud (24). A first body (86) and a second body (88) are movably positioned in the bore. The first body is sized for blocking a first opening (56) between the first and second areas. The second body is sized for blocking a larger second opening (62) which extends between the second and third areas. Manually depressing and releasing a cover member (76) of the pumping portion of the head causes pressure and vacuum to be alternatively applied in the second area of the bore. As a result, the bodies are alternatively disposed from their adjacent openings and fuel is caused to be drawn from the inlet through the bore and into an in-flow area of the element to accomplish a priming operation. In normal running condition fluid passes through the head and both bodies are disposed away from their respective openings in the bore to minimize flow restriction.

20 Claims, 5 Drawing Sheets

FILTER HEAD WITH INTEGRAL PRIMING PUMP

TECHNICAL FIELD

This invention relates to fuel filters and separators for vehicles. Specifically, the invention relates to a filter head for mounting a removable filter element which includes an integral priming pump.

BACKGROUND ART

Many types of fuel filters and separators are known in the prior art. A popular type of filter and/or separator construction is a type that has a filter head to which a replaceable "spin on" element is attached. The head is a permanent part of the fuel system of the vehicle and includes inlet and outlet connections to the fuel lines. The element may be readily removed from the filter head and a new one attached without opening the fuel line connections to the filter head.

Problems may arise when the element is replaced. The old element which is removed, is filled with fuel. The new element when it is installed, is not. Therefore, the new element introduces an air pocket into the system. This air pocket may prevent fuel flow if fuel is drawn through the head and element by vacuum produced by a downstream fuel pump. However, even if the fuel is pushed through the element and the filter head, a large slug of air in the system may cause damage to downstream components such as an injector pump or fuel injectors.

Skilled mechanics sometimes attempt to fill a new element with clean fuel before it is installed. This reduces the size of the air pocket but does not eliminate the problem.

To eliminate the air pocket in a replacement filter or separator element, others have installed priming pumps on a filter head. Such priming pumps are of two types. The first type has two flow paths for fuel through the filter head. The first flow path passes fuel from the inlet of the head directly to a fluid in-flow area of an attached element. The fuel normally flows along this first path when the engine of the vehicle is running.

When the element has been replaced and there is a need to remove an air pocket from the system, a manual valve on the filter head is actuated to select the second flow path. The second flow path directs fuel from the inlet to a pumping chamber. The pumping chamber may be a variable volume area of a manually actuated piston or diaphragm pump. Appropriate valving is used to draw fuel from the inlet into the variable volume area of the pump and then to deliver the fuel from the pump to the in-flow area of the filter.

The pumping of fuel into the in-flow area of the filter forces liquid fuel into the element. The liquid displaces the air which may be either exhaust through a vent in the filter head or forced from the outlet of the head and moved down the fuel line to an area beyond the fuel pump or other components that could be damaged by air in the line.

Once the air pocket has been displaced the manual valve on the head is returned to its original position. In this condition fuel again passes directly from the inlet of the head to the fuel in the in-flow area of the element.

A disadvantage of this construction is that it requires the use of a manual valve in the filter head. The operator must remember to actuate this valve during priming and return the valve to its original condition after the priming operation is complete. Failure to return the valve to its original position may cause a malfunction. The pump and valve construction also adds significantly to the cost of the filter head.

An alternative type of prior art filter head construction includes a priming pump directly in the fluid flow path between the inlet to the head and the in-flow area of the element. In this design fluid passes through a first check valve on the downstream side of the pumping chamber that allows fluid to flow only into the pumping chamber from the inlet. A second check valve is positioned in the fluid path on the opposite side of the pump to allow fluid to flow only out of the pumping chamber.

When it is necessary to prime the element, the pump is actuated and the valves operate to force fuel into the in-flow area of the element. After priming, when the engine is started, a vacuum is drawn on the element if the fuel pump is positioned downstream of the filter head. The vacuum is sufficient to open flow through the check valves. If a fuel pump is positioned upstream from the filter head, the fluid pressure on the inlet of the filter head is sufficient to open flow through the check valves.

A problem with this configuration is the cost associated with building a head with flow passages, a pump and check valves. A further problem is that the check valves which are always in the flow path, pose restrictions to fluid flow when the engine is in the normal running condition. Thus, there exists a need for a filter head for mounting a filter or separator element that includes an integral priming pump that is inexpensive to manufacture, easy to use and has low flow resistance.

DISCLOSURE OF INVENTION

It is an object of the present invention to provide a filter head with an integral priming pump.

It is a further object of the present invention to provide a filter head with an integral priming pump that is readily manufactured.

It is a further object of the present invention to provide a filter head with an integral priming pump that is easy to operate.

It is a further object of the present invention to provide a filter head with an integral priming pump that provides low resistance to flow.

It is a further object of the present invention to provide a filter head with an integral priming pump that has few moving parts.

Further objects of the present invention will be made apparent in the following Best Mode for Carrying Out Invention and the appended claims.

The foregoing objects are accomplished in the preferred embodiment of the invention by a filter head adapted for mounting a replaceable separator or filter element thereon. The element has an in-flow area for accepting incoming fuel, and an out-flow area for delivering fuel that has passed through the element.

The filter head includes an inlet for receiving incoming fuel from the fuel tank or other source of supply. The inlet is in fluid communication with the in-flow area of the element. The head also has an outlet which is in fluid communication with the outflow area of the element through a fluid passage in the head. The outlet of the head is connected to the remainder of the vehicle fuel system including the carburetor or fuel injection system of the engine.

An axial bore extends through the filter head. The bore extends downward from a bore opening in an exterior wall of the head. The bore has three cylindrical areas, each area of increasing diameter, with the largest diameter area of the bore adjacent to the opening. The opening in the exterior wall is closed by a plug.

The first area of the bore, which is the smallest in diameter, is in fluid connection with the inlet to the head. The second area is in fluid connection with a pumping chamber of the manual pump section of the head. A first circular opening extends between the first and second areas and is bounded by an inwardly tapered seat.

The second area of the bore is in fluid connection with the third area through a second circular opening which is of larger diameter than the first opening. The second opening is also bounded by a circular seat. The third area is in fluid connection through a fluid passage with the fluid in-flow area of the element.

A first spherical body is positioned in the bore generally in the second area. The first body is comprised of a material having a density greater than the fuel. The body is sized for acceptance by the seat surrounding the first opening. A second larger spherical body is generally positioned in the third area. The second body is sized for acceptance by the seat surrounding the second opening.

When it is desired to conduct a priming operation after an element change, the manual pump portion of the head is actuated to draw a vacuum in the second area of the bore. The vacuum pulls the first body off its seat and siphons fuel into the second area from the inlet. As the vacuum is drawn on the second area, the second body is held on its seat preventing flow between the second and third areas.

When the pump is actuated to apply pressure in the second area, the first body in the bore moves adjacent to the first seat and blocks flow between the first and second areas. The pressure in the second area forces the second body off its seat and fuel flows from the second area to the third area which results in the delivery of fuel to the fluid in-flow area of the element. This process is repeated with each cycle of the pumping portion of the head until all the air is forced out of the element. The air passes out of the element through a vent in the head, or is forced out the outlet of the head and moved to a point downstream where it does not impair operation of the fuel system.

After the priming operation is complete, the engine of the vehicle on which the fuel filter is installed may be started and flow commenced through the filter head and the element. As fuel is drawn into the inlet of the head, both bodies in the axial bore move off their associated seats to enable flow. Both bodies are sized relative to the diameters of the bore so as to pose minimal restriction to flow through the filter head.

BEST MODE FOR CARRYING OUT INVENTION

Figure 2:
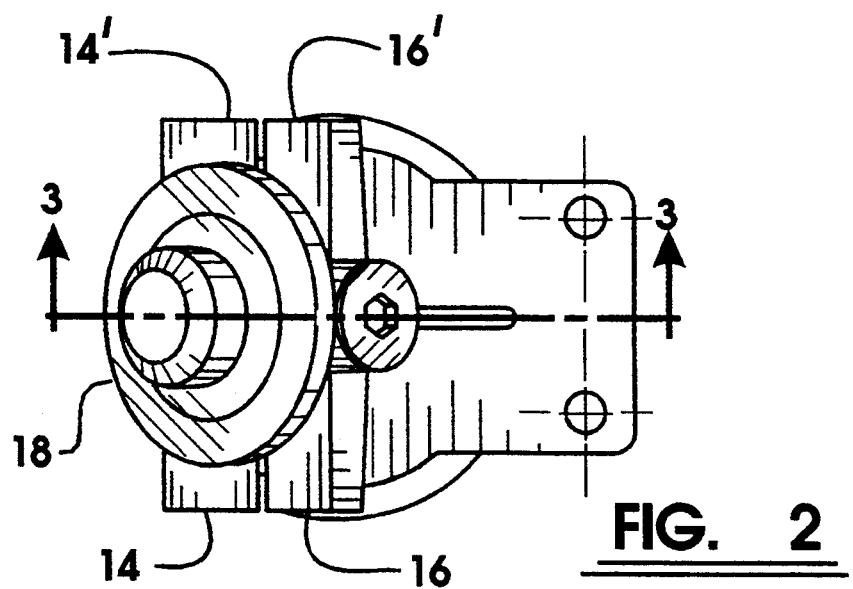
FIG. 2 is a top view of the filter head and element shown in FIG. 1.
Figure 1:
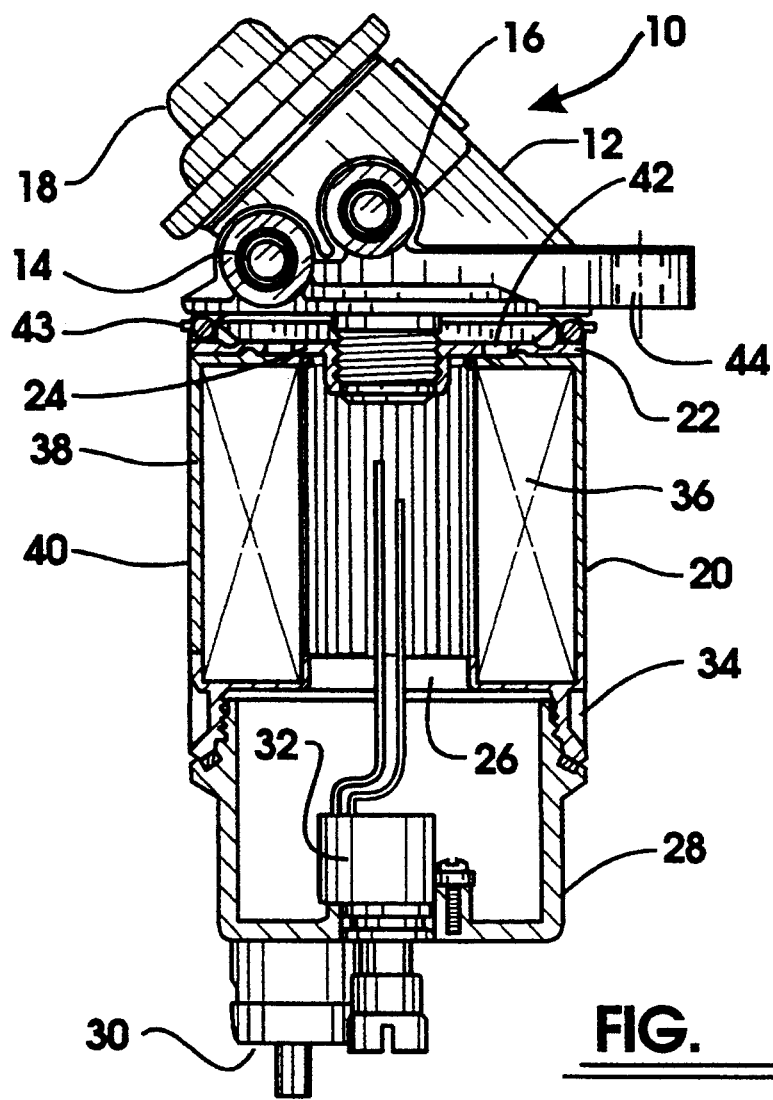
FIG. 1 is a partially sectioned side view of the filter head with integral priming pump of the present invention with an attached separator element.

Referring now to the drawings and particularly to FIG. 1, there is shown therein the preferred embodiment of the filter head with integral priming pump of the present invention generally indicated 10. The head has a body 12 with an inlet 14 and an outlet 16. The inlet and outlet have threaded openings to enable attachment of the filter head to fuel lines or other conduits of the fuel system of the vehicle in which the filter head is used.

Although for purposes of this discussion the inlet and outlet of the filter head are indicated as being on the same side of the head, those skilled in the art will know that similar inlet and outlet ports 14' and 16' respectively, are positioned on the opposite side of the head to facilitate connection of the head in fuel systems regardless of the line positions. In other embodiments the inlet and outlet may both be on the same side of the head or may be on opposite sides of the head. Regardless of what configuration is used, the ports not connected to a fuel line are plugged with conventional threaded plugs.

The filter head further includes a pump portion generally indicated 18. The pump portion is later described in detail and includes a manually actuated pump.

A separator element 20 is shown attached to head 10. Element 20 is a "spin on" type element that includes a top plate 22 which engages a central downward extending spud 24 of the head. The element is designed for separating impurities such as dirt particles and water, as the fuel flows through it.

Element 20 is adapted for inside-out flow and has a fluid in-flow area 26, which is an open cylindrical central area which receives fuel through a central opening in the spud 24.

The fluid in-flow area 26 of the element is open at the bottom to the interior of a bowl 28. Water and other impurities that are separated from the fuel collect in the bowl. Bowl 28 includes a drain valve 30 for draining impurities that may be collected in the bowl. An electric heating element 32 is also mounted on the bowl and has a portion that extends upward into the in-flow area 26. The heater 32 serves to heat the fuel when the vehicle is operated in cold temperatures. The bowl 28 is held to the element by inter-engaging thread portions, generally indicated 34, on the bowl and element.

Fuel passing through the element 20 flows from the in-flow area 26 radially outward through separator media 36. The separator media is specifically adapted for removing water and other impurities. The media may be of several types which are known in the prior art.

After the fuel passes through the media, it is delivered to an out-flow area generally indicated 38. The out-flow area is bounded by the outside periphery of the media 36 and the inside of the cylindrical wall 40 of the element. Fuel in the out-flow area passes upward through openings 42 in the top plate. The fuel passing upward out of the element is retained in the annular area above the element outside the spud by a circular gasket 43 that extends between the element and the head. The fuel that has been treated by the element then passes through the head in a fluid passage (not shown) and is delivered out of the head through the outlet 16.

The element 20 is of conventional design and does not form part of the present invention. Although the preferred form of the invention is used with a filter head adapted for receiving an element with "inside-out" flow, the invention may also be readily used with other types of elements including those which have "outside-in" flow.

The body 12 of the filter head also includes mounting holes 44. Mounting holes facilitate mounting the filter head at a suitable location on the vehicle.

Figure 3:
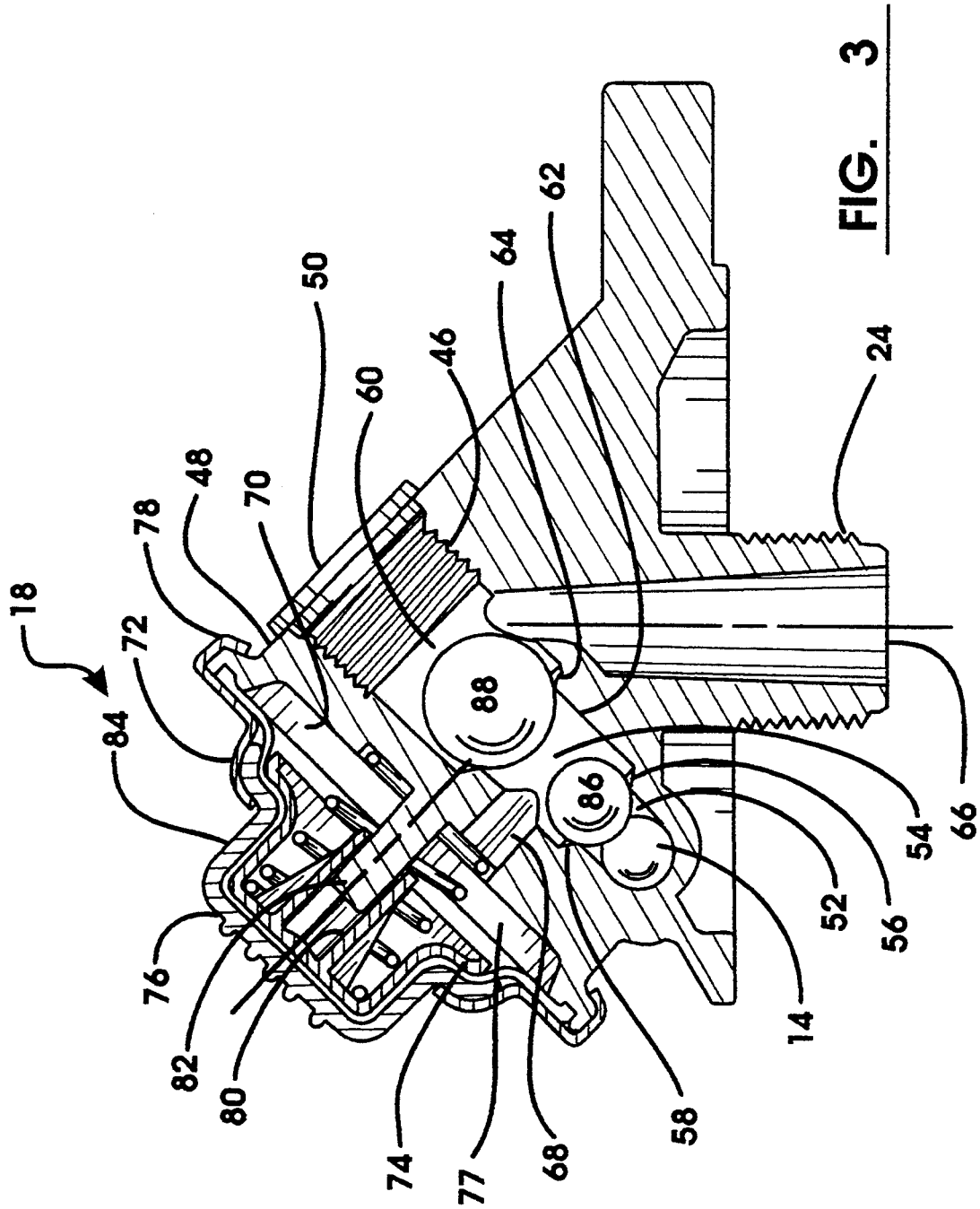
FIG. 3 is a cross sectional view of the filter head taken along line 3—3 in FIG. 2 with the head shown in a no-flow condition.

The filter head is shown in cross section in FIG. 3. The head includes a stepped axial bore 46. The bore extends in a downward direction from an opening (not separately shown) in an exterior wall 48 of the head. The opening is closed by a plug 50 which is threadably engaged in the bore.

The bore includes a first chamber or area designated 52. The first area 52 is of relatively small diameter and is in fluid communication with inlet 14 of the head. A second area 54 of larger diameter is positioned above first area 52. A first circular opening 56 extends between the first and second areas of the bore and enables flow of fuel therebetween. The first opening 56 is bounded by a circular, inwardly tapered seat 58.

A third area 60 of the bore 46 is positioned above second area 54. The third area 60 is of larger diameter than the second area. A second opening 62 extends between the second and third areas and enables fluid to flow therebetween. The second opening also has an inwardly tapered seat 64. Third area 60 is in fluid communication with a fluid passage 66 that extends through the center of spud 24 and delivers fuel to the fuel in-flow area of the element when the element is attached to the head.

The second area 54 is in fluid communication with a fluid passage 68. Passage 68 extends to a recess 70 in pump portion 18. Recess 70 is bounded by a flexible resilient generally circular diaphragm member 72. The diaphragm is supported internally by an interior support piece 74. The diaphragm 72 is supported externally by a cover member 76.

The cover member is held to the head by a retaining ring 78 which overlies the peripheral portions of the cover member. Retaining ring 78 also engages diaphragm 72 at its periphery and holds the diaphragm member in fluid tight relation with the recess 70. The diaphragm member and the recess bound a variable volume area of a pumping chamber, generally indicated 77.

Internal support piece 74 includes a sleeve 80 which is sized for slidably accepting a guide pin 82 which extends outward from the base of recess 70. A compression spring 84 biases interior support piece 74 and the diaphragm member 72 outward.

A first body 86 is positioned in bore 46. Body 86 is sized for acceptance by first seat 58 and for blocking first opening 56 when the body 86 is adjacent thereto. Body 86 is made of a rubber material that has a density greater than the fuel passing through the head so that it will not tend to float therein. The downward angle of bore 46 biases body 86 into engagement with the seat due to gravity.

A second body 88 is positioned in bore 46. Second body 88 is made of the same material as body 86, but is larger in diameter. Body 88 is adapted for engaging second seat 64 and for blocking second opening 62 when the body 88 is adjacent thereto.

In operation of filter head 10, the head is in a no-flow condition when the engine of the vehicle is shut off and no fuel is flowing thereto. This is the condition of the head at the time an element change is made. In this condition, both bodies 86 and 88 are positioned downward against their associated seats 58 and 64 respectively, as shown in FIG. 3.

Figure 4:
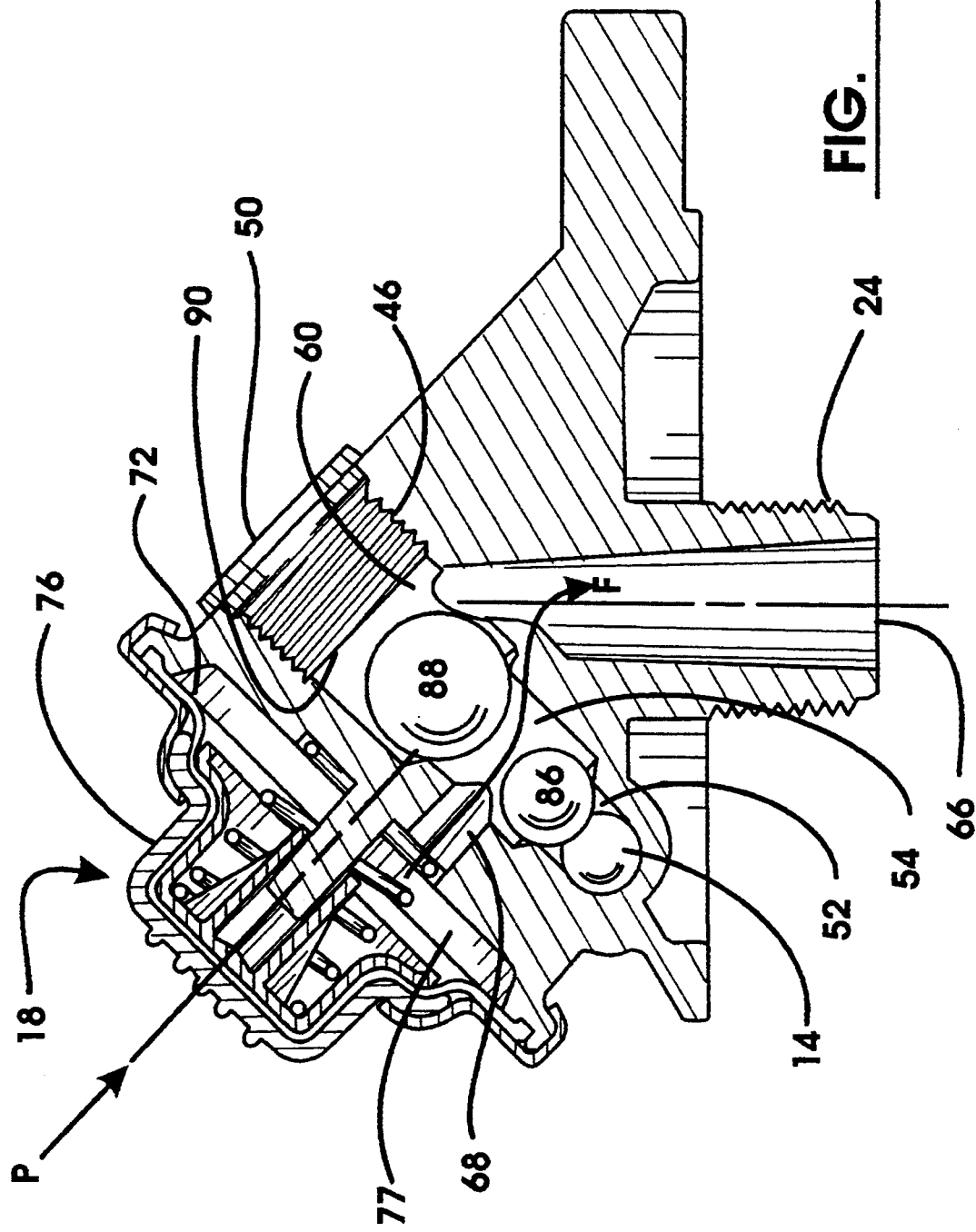
FIG. 4 is a cross sectional view of the filter head shown in FIG. 3 with the pump portion undergoing an output stroke.

After the new element has been installed, it has an air pocket that must be removed. To remove the air, cover member 76 of the pump portion 18 is pushed downward in the direction of arrow P in FIG. 4. The depression of cover member 76 deforms diaphragm 72 which decreases the volume of pumping chamber 77. This creates fluid pressure which is transmitted to the second area 54 of the bore through fluid passage 68.

The increase in pressure in second area of 54 pushes body 86 downward against the seat and prevents flow from the second area to the first area 52. The pressure in the second area further pushes body 88 upward off its seat. The pressure pushes fuel out of the second and third areas into passage 66 of spud 24, as indicated by arrow F. Body 88 is displaced upward until it is held by engagement with an inner face 90 of plug 50. Once the pressure generated in the pumping chamber is dissipated, body 88 falls back downward into engagement with its seat.

Figure 5:
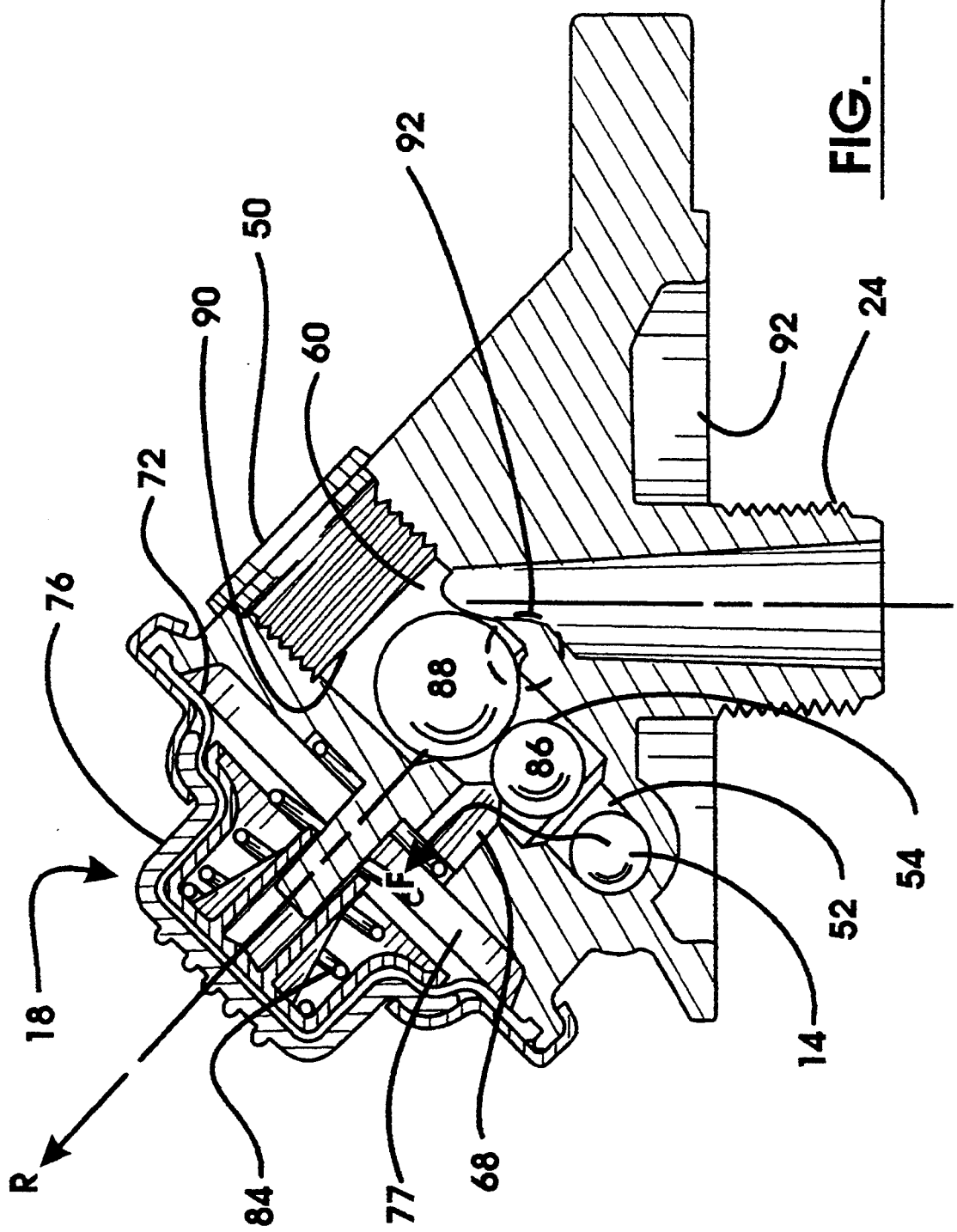
FIG. 5 is a cross sectional view of the head with the pump portion undergoing an intake stroke.

Releasing cover 76 of the pumping portion 18 of the head causes cover 76 and the diaphragm member 72 to move outward in the direction of arrow R in FIG. 5 due to the force of spring 84. As diaphragm member 72 returns to its original condition, the volume of chamber 77 increases. As the volume of chamber 77 expands, it draws a vacuum in second area 54 of the bore. The vacuum in the second area holds body 88 downward against its seat. At the same time body 86 is pulled upward off it seat until it abuts body 88. The vacuum draws fuel from the inlet 14 through the first chamber 52, and into the second chamber 54 and the pumping chamber 77. The in-flow of fuel is indicated by arrow F in FIG. 5.

Once the fuel has been drawn in by the vacuum and the pressure equalizes, both bodies 86 and 88 return to their seats and are in the positions shown in FIG. 3. The cover 76 of the pump is repeatedly pushed and released, drawing fuel from the inlet and delivering it to the fluid in-flow area of the element through the areas of the axial bore.

The priming process which delivers fuel to the element, forces the air that was originally in the element when it was attached to the head, into the fluid out-flow area of the element and toward the outlet in the head. The displaced air passes from the element into an area 92 located annularly around the spud in the filter head. The air then passes through a fluid passage in the head (not shown) and to the outlet 16 which is shown in phantom in FIG. 5. The pumping action is repeated until the air is forced out of the head and down the fuel line to an area where it will not impair operation of the fuel system.

In other embodiments of the invention, area 92 of the filter head may be in connection with a vent of a construction which is well known in the prior art. The vent enables air to escape from the filter head, but prevents the escape of liquid. A vent may be used to avoid the need to have to push the air long distances down the fuel line from the filter head.

Figure 6:
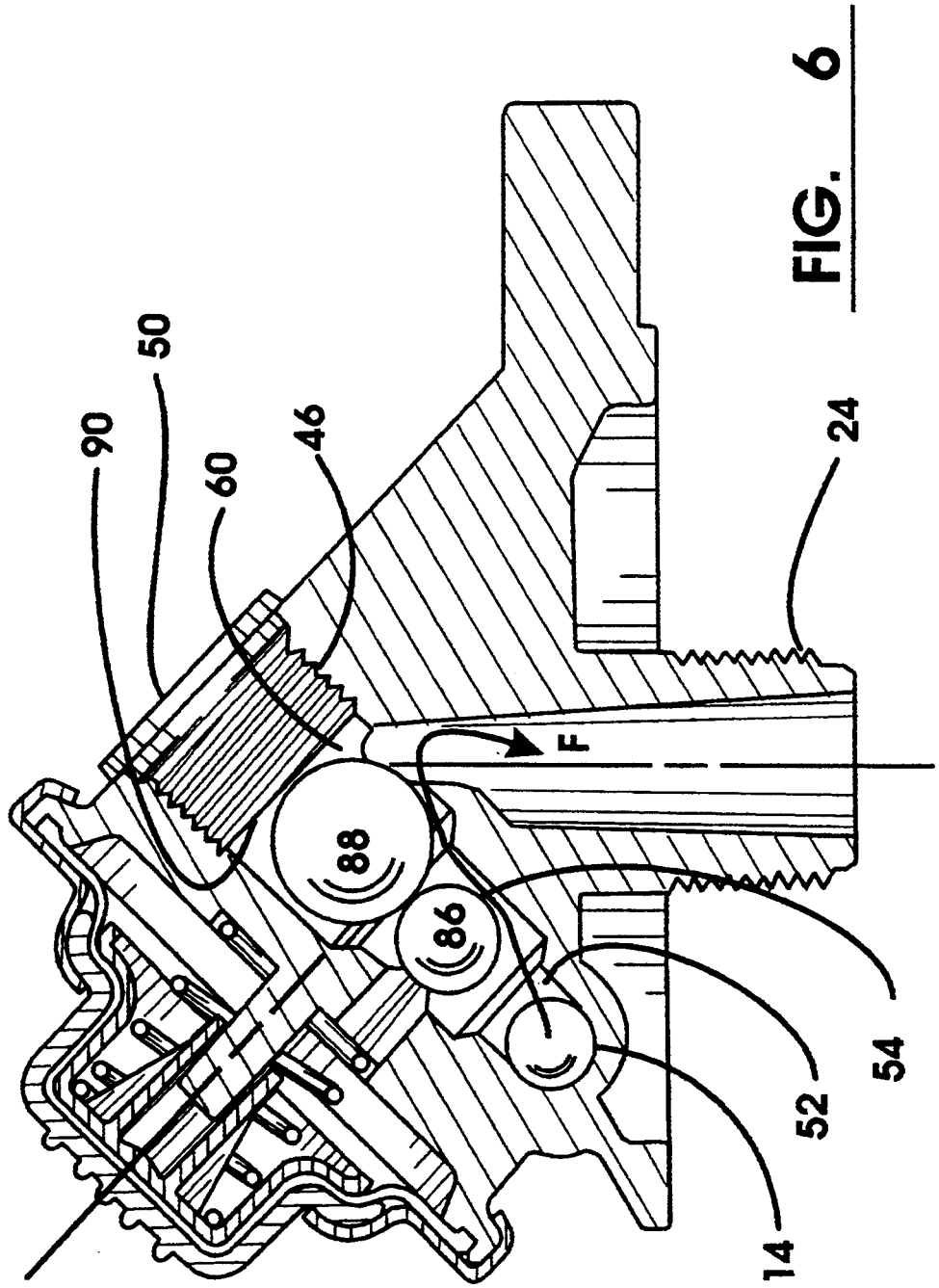
FIG. 6 is a cross sectional view of the filter head shown with fuel flowing through the head in a normal vehicle running condition.

Once the air is removed, the engine may be started. If fuel is drawn through the element and filter head by vacuum, the incoming fuel will pass into the inlet 14 of the head and upward through the areas of bore 46. The fuel flow will cause bodies 86 and 88 to be lifted from their respective seats as shown in FIG. 6. This enables fuel to flow in the annular clearances between the bodies and the walls of the bore. The bodies are sized such that they provide a relatively large flow area between the periphery of the bodies and the bore so that restriction to flow is minimized.

In the preferred embodiment of the invention, the bodies are sized so that body 88 abuts the inner wall 90 of plug 50 and body 86 abuts body 88. As a result, in the running condition the bodies are positioned to prevent significant restriction to flow. Of course, in other embodiments of the invention, bodies of different shapes and sizes may be used.

The spherical character of bodies 86 and 88 also makes them inherently self-cleaning. This avoids the collection of impurities on the bodies which could impair their function as part of check valves means. The filter head of the present invention is also constructed so that it functions equally well in systems where the head is positioned on the downstream side of a fuel pump and fuel is pushed into the inlet by pressure rather than drawn through by vacuum.

A further significant advantage of the filter head of the present invention is the reduced cost of manufacture. The multi-stepped bore may be readily molded or machined in the head. This construction eliminates the need for multiple separate chambers and fluid passages which are required in other designs. Further, the bodies 86 and 88 which serve as part of check valve means may be installed by simply dropping them into the bore before it is closed by plug 50 during the assembly operation. This is much less costly than installing other types of check valve systems. Further, if a problem should develop with the bodies due to accumulations of impurities or other problems, cleaning or repair may be readily accomplished by removal of plug 50.

In the preferred form of the invention the bore 46 extends downward at a 45 degree angle. In other embodiments other downwardly directed bores may be used. Further, other embodiments of the invention may include biasing means such as springs for biasing the bodies against their associated seats, so that the bore may extend in other orientations.

Thus, the new filter head with integral priming pump of the present invention achieves the above stated objectives, eliminates difficulties encountered in the use of prior devices, solves problems and attains the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations given are by way of examples and the invention is not limited to the exact details shown or described.

Having described the features, discoveries and principles of the invention, the manner in which it is constructed and operated, and the advantages and useful results obtained, the new and useful structures, devices, elements, arrangements, parts, combinations, systems, equipment, operations and relationships are set forth in the appended claims.

I claim:

1. A filter head for removably mounting a replaceable filter element thereon, said filter element having an inlet and outlet at one end thereof, said filter head comprising:

means for removably mounting said filter element on said head, said means for removably mounting including first passage means for connection to the inlet of said filter element and second passage means for connection to the outlet of said filter element;

an inlet for providing fluid communication with a supply of fluid;

an outlet fluidly connected to said second passage means for permitting filtered fluid to exit said head;

a first fluid chamber in said head in communication with said inlet;

a second fluid chamber in said head adjacent said first chamber;

first fluid passage means for passing fluid between said first and second chambers, said first fluid passage means including a first opening bounded by a first seat, said first opening having a first cross sectional area, and wherein in an operative orientation of said filter head said fluid passes from said first chamber to said second chamber upwardly through said first seat;

a first body in said second chamber, said first body movable in said second chamber between a first position adjacent said first seat and a second position disposed from said first seat, wherein said first body blocks fluid flow from said second chamber to said first chamber when said first body is adjacent said first seat, and enables flow when disposed from said seat;

a third chamber in said head adjacent said second chamber;

second fluid passage means for passing fluid between said second and third chambers, said second fluid passage means including a second opening to said third chamber, said second opening bounded by a second seat, said second opening having a second cross sectional area that is larger than said first cross section area of said first opening, and wherein in said operative orientation said fluid passes from said second chamber to said third chamber upwardly through said second seat;

a second body is said third chamber, said second body movable in said third chamber between a third position adjacent said second seat and a fourth position disposed from said third position, wherein said second body blocks fluid flow from said third chamber to said second chamber when said second body is adjacent said second seat and enables flow when disposed from said second seat; and wherein said first fluid passage means is fluidly connected to said third chamber to pass fluid from said third chamber to said filter element when said element is mounted to said head;

pumping means in fluid communication with said second chamber through a pump passage opening in said second chamber between said first and second seats, for alternatively drawing a vacuum and applying pressure in said second chamber, said pumping means in fluid connection with said second chamber only through said pump passage opening.

2. The filter head according to claim 1 wherein said first, second and third chambers are co-axially aligned along a common axis, and said second chamber has a uniform second chamber cross sectional area larger than a cross sectional area of said first chamber, and wherein said third chamber has a uniform third cross sectional area larger than a cross sectional area of said second chamber.

3. The filter head according to claim 2 wherein said first and second seats are generally circular in cross section, and wherein said second and third chambers are generally circular in cross section.

4. The filter head according to claim 3 wherein said filter head further includes an opening in an exterior wall of said head contiguous with said third chamber, said opening co-axial with said chambers and a closing member closing said opening, 5. The filter head according to claim 4 wherein said closing member is removable from said opening.

6. The filter head according to claim 5 wherein said first and second bodies are generally spherical.

7. A filter head according to claim 6 wherein said pumping means includes a resilient diaphragm member bounding a fourth chamber, said fourth chamber in fluid communication with said second chamber through said pump passage opening.

8. The filter head according to claim 7 wherein said fourth chamber is in fluid communication with said second chamber through fourth fluid passage means for passing fluid therethrough, said fourth fluid passage means terminating in said pump passage opening in said second chamber.

9. The filter head according to claim 8 wherein said common axis extends at a 45 degree angle relative to an axis of said first passage means.

10. A filter head for removably mounting a replaceable filter element thereon, said filter element having an inlet and outlet at one end thereof, said filter head comprising:
   a body;
   means for removably mounting said filter element on said body, said means for removably mounting including first passage means for connection to the inlet of said filter element and second passage means for connection to the outlet of said filter element;
   an inlet for providing fluid communication with a supply of fluid;
   an outlet fluidly connected to said second passage means for permitting filtered fluid to exit said head;
   a bore extending from a bore opening in a wall of said body, said bore including a first cylindrical area of a first diameter, a second cylindrical area of a second diameter, and a third cylindrical area of a third diameter, said third area adjacent said bore opening and in fluid communication with said filter element when said element is mounted on said body, said second area axially disposed further away from said opening than said third area, and said first area axially disposed further away from said opening than said second area and wherein said third diameter is greater than said second diameter, and said second diameter is greater than said first diameter;
   first check valve means in said bore for enabling fluid flow from said first to said second area and preventing flow from said second area to said first area;
   second check valve means in said bore for enabling fluid flow from said second area to said third area and preventing flow from said third area to said second area;
   the inlet of said body including means for delivering fluid into said first area of said bore; and
   wherein said first fluid passage means is fluidly connected to said third area to permit fluid communication between said third area and the inlet of said filter element;
   pumping means in fluid communication with said second area for alternatively drawing a vacuum and applying pressure in said second area under control of an operator, said pumping means in fluid communication with said second area only through a pump passage opening, said pump passage opening located in said second chamber between said first and second check valves.

11. The filter head according to claim 10 wherein said first and second areas are in fluid communication through a first opening, and said second and third areas are in fluid communication through a second opening, and wherein said first check valve means comprises a first movable body for blocking said first opening when adjacent thereto and means for biasing said first body towards said first opening; and wherein said second check valve means comprises a second movable body for blocking said second opening when adjacent thereto, and means for biasing said second body towards said second opening.

12. The filter head according to claim 11 whereby said bore opening of said bore is disposed in an upward direction from said first area when said filter head is in an operative orientation, and whereby gravity biases said first and second bodies towards said first and second openings respectively.

13. The filter head according to claim 12 wherein said bore opening is in an exterior wall of said head, and said head further includes a closing member for closing said bore opening.

14. The filter head according to claim 13 wherein said pumping means comprises an enclosed pumping chamber bounded by a resilient deformable member, said chamber in fluid communication with said second area of said bore through a pump passage, said pump passage extending to said pump passage opening.

15. The filter head according to claim 14 wherein said first and second bodies are generally spherical in shape.

16. The filter head according to claim 15 wherein said closing member is a removable plug.

17. The filter head according to claim 16 wherein said first and second openings include first and second inwardly tapered seats respectively, said first and second seats adapted for accepting said first and second bodies respectively.

18. The filter head according to claim 17 wherein said plug has an inner face for engaging said second body when said second body is displaced from said second seat by fluid flowing from said second area to said third area.

19. The filter head according to claim 18 whereby said first body abuttingly engages said second body when said first body is displaced from said first seat by fluid flowing from said first area to said second area.

20. A filter head for removably mounting a replaceable filter element thereon, said filter element having an inlet and outlet at one end thereof, said filter head comprising:

an inlet admitting liquid to said head;

an outlet passing fluid from said head;

means for removably mounting said filter element on said body, said means for removably mounting including first passage means for connection to the inlet of said filter element and second passage means for connection to the outlet of said filter element;

a stepped bore, said bore including a first area having a first diameter, a second area adjacent said first area and having a second diameter greater than said first diameter, and a third area adjacent said second area and having a third diameter greater than said second diameter and wherein a first opening extends in said bore between said first and second areas, and wherein a second opening extends in said bore between said second and third areas, and wherein said first area is in fluid communication with said inlet through a first fluid passage, and said third area is in fluid connection with said first passage means;

a first movable body in said second area movable between a first position blocking said first opening and a second position disposed from said first opening;

a second movable body in said third area, said second movable body movable between a third position blocking said second opening and a fourth position disposed from said second opening;

a variable volume area wherein a volume is variable by movement of a movable member bounding said variable volume area;

a further fluid passage through said head from said variable volume area to a passage opening in said second area between said first and second openings, said further fluid passage fluidly separated from said bore except though said passage opening; and wherein said means for removably mounting includes an annular member on said head releasably enagageable with said element, said annular member including a member fluid passage area extending axially therethrough and defining a portion of said first passage means, whereby said member fluid passage is in fluid connection with said element when said element is attached to said head.

* * * * *